United States Patent [19]

Chao

[11] Patent Number: 5,278,828
[45] Date of Patent: Jan. 11, 1994

[54] METHOD AND SYSTEM FOR MANAGING QUEUED CELLS

[75] Inventor: Hung-Hsiang J. Chao, Lincroft, N.J.

[73] Assignee: Bell Communications Research, Inc., Livingston, N.J.

[21] Appl. No.: 893,265

[22] Filed: Jun. 4, 1992

[51] Int. Cl.$^5$ ............................................. H04J 3/26
[52] U.S. Cl. .................................. 370/85.6; 370/60; 370/94.1
[58] Field of Search .............. 370/60, 60.1, 61, 85.6, 370/94.1, 94.2

[56] References Cited

U.S. PATENT DOCUMENTS

| | | | |
|---|---|---|---|
| 5,016,248 | 5/1991 | Kudoh | 370/85.6 X |
| 5,083,269 | 1/1992 | Syobatake et al. | 370/85.6 X |
| 5,126,999 | 6/1992 | Munter et al. | 370/85.6 X |
| 5,189,667 | 2/1993 | Esaki et al. | 370/85.6 X |

OTHER PUBLICATIONS

L. Zhang, "VirtualClock: A new traffic control algorithm for packet switching networks," in Proc. SIGCOMM '90, Philadelphia, Pa., Sep. 1990, pp. 19-29.
J. S. Turner, "New directions in communications (or which way to the information age?)" IEEE Commun. Mag., vol. 24, No. 10, pp. 8-15, Oct. 1986.

Primary Examiner—Douglas W. Olms
Assistant Examiner—Melvin Marcelo
Attorney, Agent, or Firm—Leonard Charles Suchyta; James W. Falk

[57] ABSTRACT

A queue management method and system manages queued cells in such a way that higher priority cells are always served first, the low priority cells are dropped when the queue is full and, within the same priority, any interference is prevented. Four different architecture designs for such queue management are presented and their implementation feasibility and hardware complexity are compared and contrasted. A departure sequence is assigned to each cell in the novel architecture to implement the queue management. The sequence applies the concepts of fully distributed and highly parallel processing to schedule cell sending or dropping sequences. Preferably, a sequencer is provided such that the queue size and the number of priority levels can grow flexibly and without limit.

5 Claims, 6 Drawing Sheets

Input 1 to 6: ave. arrival rate=0.025 cell/slot, ave. burst length (B)= 1 cell

Input 7 to 12: ave. arrival rate=0.125 cell/slot, ave. burst length (B) =1 to 20 cells

Fig. 2b q: probability of starting a new burst in each time slot

HP: Head pointer
TP: Tail pointer

METHOD AND SYSTEM FOR MANAGING QUEUED CELLS

CROSS-REFERENCE TO RELATED APPLICATIONS

This application is related to U.S. patent application entitled "Method and System for Controlling User Traffic to a Fast Packet Switching System, Ser. No. 893,274" filed on the same date as the present application by H. HS. Chav and application entitled "Sequencer Chip Device" Ser. No. 893,266, also filed the same date by H. HS. Chav and which is hereby expressly incorporated by reference in its entirety.

TECHNICAL FIELD

This invention relates to method and system for managing queued cells and, in particular, to method and system for managing queued cells for ATM switches and multiplexors.

BACKGROUND ART

Broadband integrated service digital networks (B-ISDN) provide end-to-end transport for a broad spectrum of services flexibly and efficiently via the asynchronous transfer mode (ATM) technique. Information is packetized and carried in fixed length "cells." Each cell consists of 53 octets including 5-octet header and 48-octet information fields. Due to the natural randomness of the broadband traffic, queues are required at various placed in ATM networks to absorb instantaneous traffic bursts that may exceed the network bandwidth temporarily.

Various architectures for ATM switches, also called fast packet switches, have been proposed. Among them, switches with output queues (including shared output buffers) have been proven to give the best delay/throughput performance.

Figure 1:
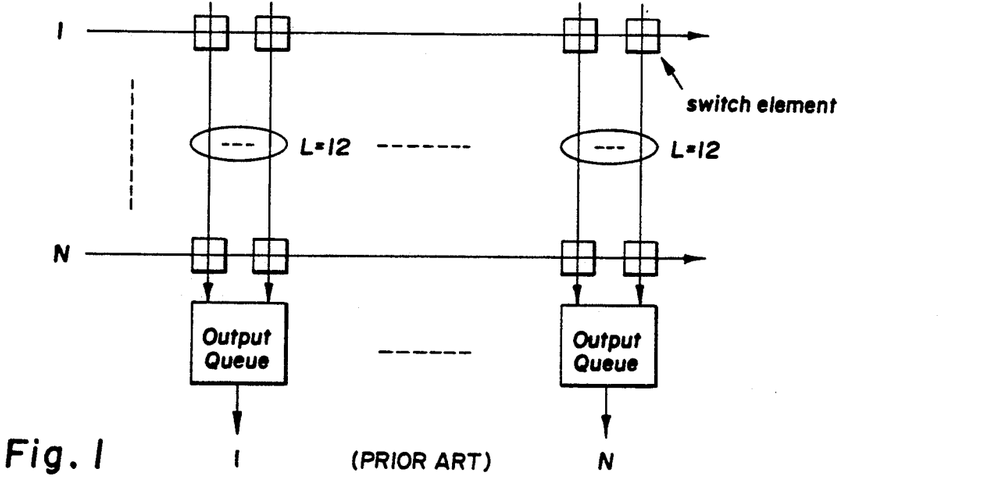
FIG. 1 is a schematic view illustrating a typical packet switch with output queues.

FIG. 1 shows a prior art ATM switch fabric with output queues which I have previously proposed and which is an improved version of a prior art knockout switch. It is capable of accommodating more than 8,000 input ports to achieve a Terabit/sec throughput. Cell filtering and contention resolution functions are performed in parallel in small switch elements (SWE), located at the intersection of cross-bar lines.

The SWE examine incoming cells from horizontal lines and route them properly to one of the L links of each output port. The L can be chosen as 12 in order to have less than $10^{-10}$ cell probability caused by contention among the L routing links. The ATM switch fabric will route higher priority cells to output ports when congestion occurs among the L routing links. At any given cell time slot (about 2.83 $\mu s$), if there is more than one cell arriving at an output port, all except one will be stored in the output queue waiting to be sent to the transmission link.

Under normal traffic conditions, most of the queued cells will be transmitted on the link and a simple first-in-first-out (FIFO) queue discipline will provide acceptable cell loss/delay performance. However, under congestion, a queue management algorithm is essential to discipline the queued cells in such a way that higher priority cells will always be sent to the outputs before the lower priority ones, the low priority cells will be dropped when the queue is full, and within the same priority any interference on others' reserved network resources is prevented by setting up some policies and disciplines (or firewalls).

Since different traffic has different service requirements, real-time traffic such as video and voice should be assigned high priorities to satisfy its stringent delay requirements while data traffic may be handled at lower priorities tolerating longer delay. A simple FIFO queue won't be able to handle the prioritized cells nor prevent the interference of one connection with another.

For instance, consider a situation in which a conventional FIFO is used for each output queue of the switch as shown in FIG. 1. When long cell bursts from a misbehaving user are queued up in the FIFO, the other regular arrival cells will be delayed or even dropped when the FIFO is full.

Round-robin disciplines are believed able to provide fairer service than the FIFO discipline when the network is congested. Their throughput/delay performance comparison can be found in the article entitled "Queuing Disciplines And Passive Congestion Control In Byte-Stream Networks" by S.P. Morgan, IEEE INFOCOM '89, 1989, pp. 711-720. The round-robin discipline usually operates by maintaining a separate FIFO queue for each connection, which is identified by a 2-octet VCI (virtual channel identifier) in each cell header. The queues are visited in a cyclic order and thus, when congestion occurs, light-traffic and short-burst users are protected by evenly cutting back all user's throughput to approximately the same level.

Three hardware implementations for the round-robin discipline were presented in the article entitled "Fast Switching And Fair Control Of Congested Flow In Broadband Networks" by M. G. H. Katevenis, IEEE J. Select Areas Commun., Vol. 5, No. 8, pp. 1315-11325, Oct. 1987. However, their hardware complexity increases as either the number of connections (VCIS) or priority levels increase. Especially, as the number of VCIs approaches 64K, the hardware circuitry grows considerably to the point that per VCI processing speed limitation may become the system's bottleneck. Furthermore, each connection may request different transmission rates at the initial call set up and thus the round-robin discipline may not serve all users "fairly" in the sense that every user shares the remaining resource equally, rather than sharing the resource proportionally to the transmission rates that they have requested.

SUMMARY OF THE INVENTION

An object of the present invention is to provide a method and system for efficiently and effectively managing queued cells for ATM switches and multiplexors.

In carrying out the above object and other objects of the present invention, a method is provided for managing cells appearing on a plurality of channel inputs. Each of the cells has a virtual channel identifier (VCI) indicating a priority level of the cell. The method includes the steps of multiplexing the inputs into a common high-speed channel output, storing the cells on the channel output in first memory means, and selecting a stored cell having the highest priority level to obtain a validated cell. The method further includes the steps of retrieving the validated cell from the first memory means and transmitting the retrieved cell.

In accordance with my invention, the system and architecture include a sequencer circuit which sorts cells' priority levels immediately after cells arrive and are stored in the first memory means or cell pool. The utilization of the sequencer circuit allows my inventive system to handle thousands of priority levels without causing any bottleneck in the operation of the system. This large number of priority levels comes from the situation where there are combined cells' service classes with the so-called departure sequence numbers, described herein, to achieve fairness among the different users and reduce traffic burstiness to improve network throughput performance.

The objects, features and advantages of the present invention are readily apparent from the following detailed description of the best mode for carrying out the invention when taken in connection with the accompanying drawings.

DETAILED DESCRIPTION

In general, there is disclosed herein a queue management employing the mechanism called VirtualClock by assigning a departure sequence to every cell in the queue so as to provide "fairness" among all virtual circuits and to set up resource "firewalls" to prevent interference among them. The concepts and design of the queue management discussed herein can be generally applied to any other ATM switches or statistical multiplexers with either input or output queues. A novel architecture to implement the queue management is proposed. It applies the concepts of fully distributed and highly parallel processing to schedule cell sending or dropping sequences. In contrast to the prior art round-robin implementations previously discussed, the hardware complexity of the proposed architecture is independent of the number of the VCIs.

A VLSI chip (called a "sequencer" in the above-noted application entitled "Sequencer Chip Device") is preferred. The chip contains about 150K CMOS transistors and is designed using a regular structure such that the queue size and the number of priority levels can grow flexibly and without limit. As described in the application immediately above, in addition to the application in queue management, the chip can also be used to sort out-of-sequence cells efficiently and economically at the receive end when the cells are transmitted through different physical channels in the networks. By doing this, each cell would need to carry sequence numbers which are not currently part of any B-ISDN standard.

The first section hereinbelow discusses the effects of long burst traffic on other connections in terms of cell losses and delays, and then sketches a mechanism to prevent such interference. The next section illustrates four possible architectures to implement queue management and shows that the last one performs the best in terms of the implementation feasibility and hardware complexity. A final conclusion is given in the last section.

Effects of Long Burst Traffic

One of the basic functions of network flow control is to monitor users' traffic and prevent interference between them. During the call set up, the user provides to the network traffic information such as the peak bit rate, the average bit rate, and the maximum burst length. Based on the current status, the network will either accept the new call, or reject it if it will violate the negotiated grade of service of existing connections. Once the new call has been accepted, it will be monitored to see whether it follows the traffic characteristics that it has claimed. Usually misbehaving users of higher bit-rate traffic (e.g. by increasing their burst length) have more impact on the others than the ones with lower bit rates. The following Section details this effect and shows a mechanism to set up firewalls between them so that the less bursty traffic won't be disturbed by the more bursty sources.

Simulation Models and Results

Figure 2A:
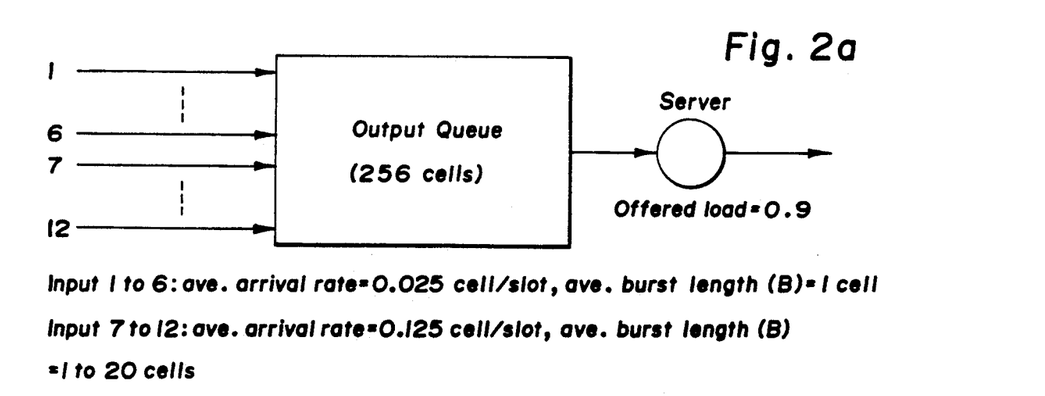
FIGS. 2A and 2B show a schematic view illustrating a simulated output queue model and cell arrival model.
Figure 2B:
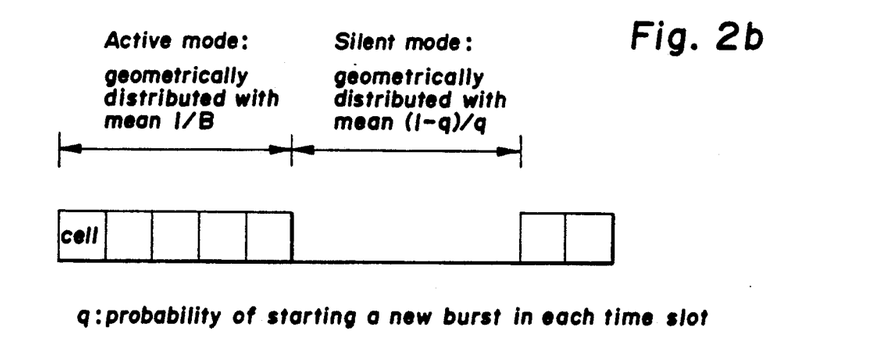

The simulated model shown in FIG. 2 represents an output queue of the ATM switch in FIG. 1, where cells from 12 inputs are stored in a single queue that has a size of 256 cells. A fixed-rate server sends out a cell at every time slot if the queue is not empty. Although the traffic models used herein are relatively simple and do not represent any specific services, the simulation results could still be qualitatively applied to any other more practical source models.

It is assumed that inputs 1 to 6 have an average arrival rate (AR) of 0.025 cell/time slot while inputs 7 to 12 have five times that, or 0.125 cell/time slot. The aggregated traffic produces an offered load of 0.9 to the server.

If the average burst length of inputs 1 to 6 is fixed to be one cell and that of inputs 7 to 12 is varied from one to 20 cells, the traffic source model alternates between active and silent modes as shown in FIG. 2. During a silent mode, no cells are generated and during an active mode cells are produced back to back, although they can be separated by regular intervals. The lengths of the active and silent periods are geometrically distributed with average length of 1/B and (1−q)/q, respectively, where B is the average burst length and q is the probability of starting a new burst per time slot. If the cells are not back to back, the effect of the long burst traffic will be less.

Figure 3:
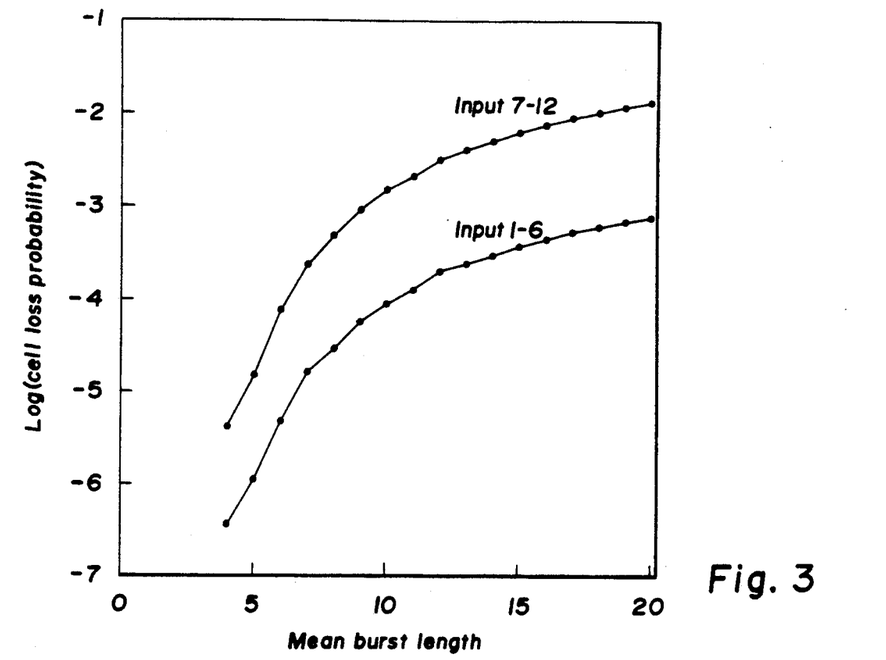
FIG. 3 is a graph illustrating how cell loss probability of inputs 1 to 6 of FIG. 2 increases as the burst length of inputs 7 to 12 increases.
Figure 4:
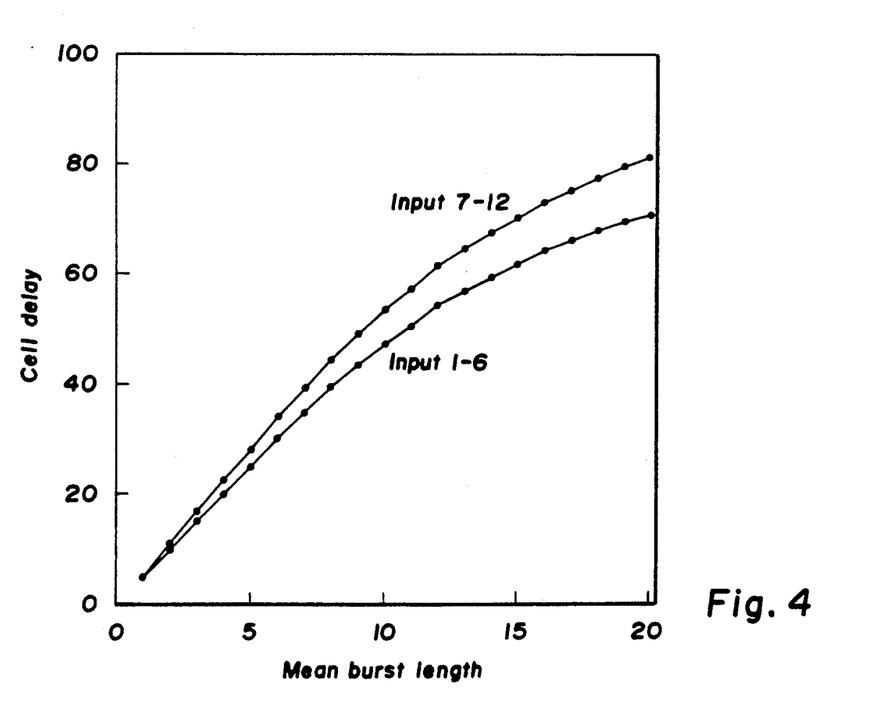
FIG. 4 is a graph illustrating how cell delay of inputs 1 to 6 of FIG. 2 increases as the burst length of inputs 7 to 12 increases.

To evaluate the effect of the long burst traffic, the model in FIG. 2 was simulated on multiple computers to reduce the simulation time. FIG. 3 shows the cell loss probability of input 1 to 6 increasing from less than $10^{-8}$ to $10^{-3}$ as the burst length of inputs 7 to 12 increases from 1 to 20, while FIG. 4 shows that the cell delay increases from 5 to 70 cell times.

DEPARTURE SEQUENCE

A mechanism called VirtualClock was developed by L. Zhang in her paper entitled "Virtual Clock: A New Traffic Control Algorithm For Packet Switch Networks" in SIGCOMM '90, Philadelphia, Pa., pp. 19-29, Sep. 1990. This mechanism monitored multiple connections' behavior and set up firewalls to prevent interference among them. The idea of the VirtualClock is to assign a departure sequence (DS) to every cell based on its average arrival rate (AR) that is claimed at the call set up. A queue management algorithm serves the cell that has the smallest value of departure sequence. The algorithm is as follows:

1. Upon the arrival of the first cell of a connection i, $DS_i$ = real-time, where the real-time can be the value of a counter incremented by one per cell time.
2. Upon receiving every cell from the connection i, $DS_i$ = maximum (real-time, $DS_i + 1/AR_i$).

Figure 5A:
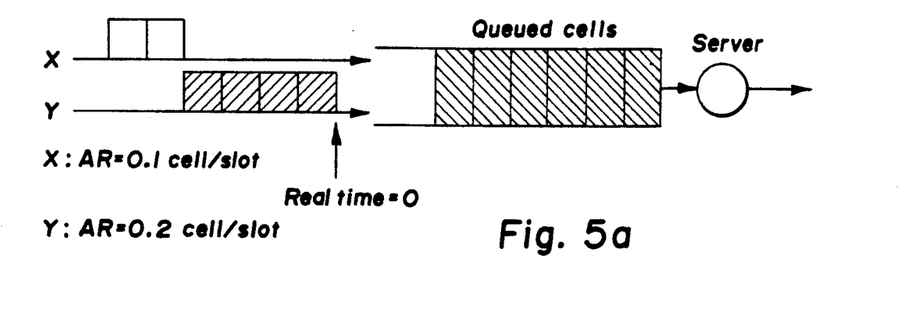
FIGS. 5a through 5c are schematic views illustrating how cells are transmitted according to their departure sequences that are assigned based on the average arrival rates (AR)
Figure 5B:
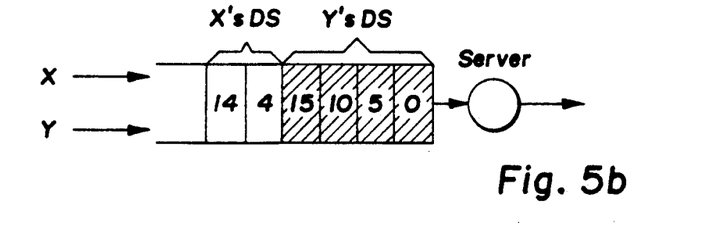
Figure 5C:
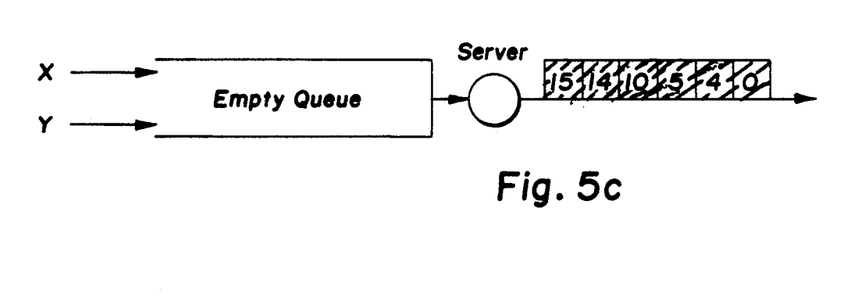

FIG. 5 shows an example of how the departure sequence can be used to protect the short burst cells from being mistreated. Let's assume the input X's AR=0.1 cell/time slot and B=2 cells, and the input Y's AR=0.2 cell/time slot and B=4 cells. Initially, the real-time is reset to zero. Immediately following the reset, 4 consecutive cells arrive from the input Y and then 2 consecutive cells from input X as shown in FIG. 5(a). The DS of the first cell from the Y input is assigned the real-time value (zero) and the following cells will be assigned 5, 10 and 15. When the first cell of the X input arrives, the real-time value will be 4, which will then be assigned to this cell. For X's 2nd cell, its DS will be set to maximum (5,4+10) or 14. FIG. 5(b) shows the DSs of all six arrived cells. Based on these DS values, the queue manager will transmit cells with smaller values sequentially as shown in FIG. 5(c).

Figure 6:
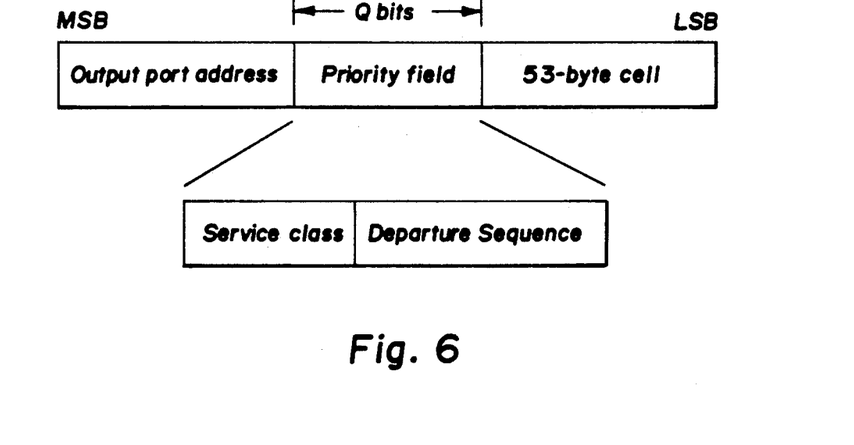
FIG. 6 is a schematic view illustrating the priority field of the cells routed in the switch network, and how it consists of the service class and departure sequence.

For traffic that has different service classes, the priority field of each cell can be constructed from the service class combined with the departure sequence. An arrangement of the priority field in the cells routed in the internal ATM switch network can be like the one shown in FIG. 6, which also provides firewalls between different priority levels. Accordingly, the number of cell priority levels (P) will be $2^Q$, where Q is the number of bits in the priority field.

Architectures for Queue Management

To facilitate an understanding of my invention, I have disclosed herein three possible architectures based on the prior art and which, while implementing queue management for ATM switches or statistical multiplexors, all have limitations which prevent them from being able to handle very large numbers of priority levels, as of the order of a few thousands. Following the discussion of these three implementations, there is set forth the novel architecture of my present invention including a sequencer to enable the architecture to handle thousands of priority levels without causing any bottleneck. The example used to illustrate the architecture herein has 12 inputs and one output, although it can be generally applied to any number of inputs plus outputs up to one hundred (for example). Their hardware complexity in terms of memory requirements and implementation constraints will be compared and contrasted.

Store Cells in Multiple FIFOs (First Architecture)

Figure 7:
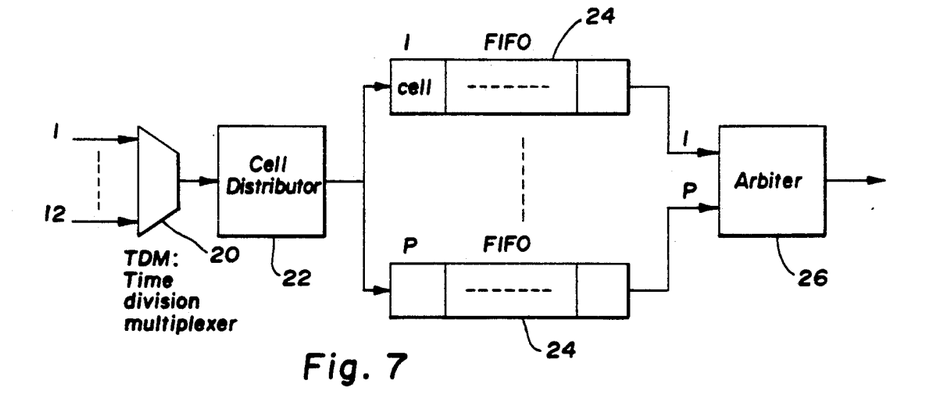
FIG. 7 is a schematic view of a first possible architecture wherein cells that have the same priority are stored in the same FIFO.

FIG. 7 shows the most straightforward way to implement queue management. Cells carrying valid information from all 12 inputs are time-division multi-plexed by a multiplexor 20 into a higher speed channel and distributed by a cell distributor 22 to proper FIFOs 24 based on their priority levels. At the output side, an arbiter 26 will choose a cell with the highest priority level to send out. The lower priority cells won't be accessed until all the higher priority ones have been transmitted.

Let us assume that the size of the output queue is 256 cells so that the maximum delay/jitter through the switch is less than 1ms (about 360 cells). The size of each FIFO 24 is then 256 cells, as well, in order to consider the worst case that all 256 cells have the same priority and are stored in the same FIFO 24. The total FIFO capacity will be 256×P cells where P is the number of the priority levels. If it is assumed that the cell's priority field consists of 2 service-class bits and 12 departure sequence bits, the P value will be $2^{14}$ or 16,384. Then the total FIFO capacity will be about 4.3 million cells, or 222M bytes for the cell size of 53 bytes.

In each cell time (about 2.83 μs), 12 cells are time-division multiplexed and distributed to the FIFOs 24. Accordingly, each cell's process time in the distributor 22 plus the writing time for the FIFOs 24 should be less than 2.83 μs/12, or 233 ns. This can be easily achieved provided that the cell's bit stream is converted to multiple parallel bytes before being written into the FIFOs 24. However, the arbiter's speed is a bottleneck, because in every 2.83 μs, it has to scan all 16,384 FIFOs 24 (the worst case) to select a single cell to transmit. This is very difficult to implement with the state-of-art hardware technology.

Store Cells in a Pool (Second Architecture)

Figure 8:
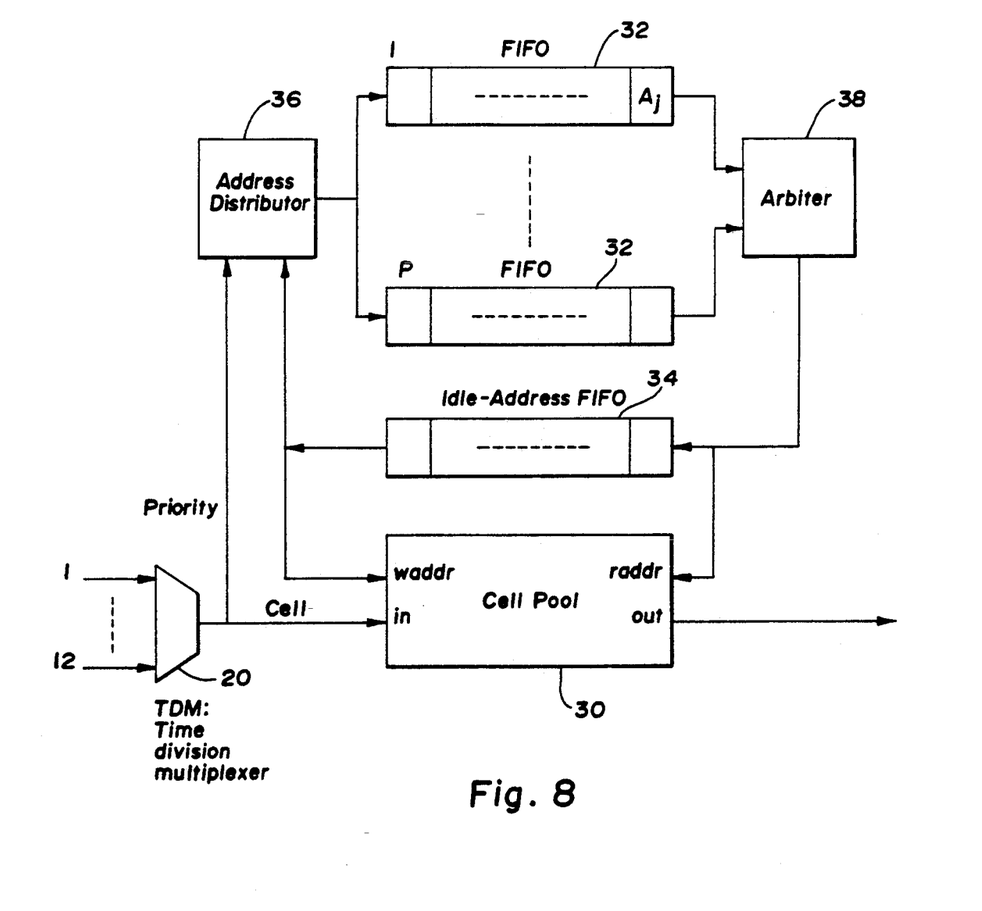
FIG. 8 is a schematic view of a second possible architecture wherein a FIFO buffer is associated with each priority, in which the addresses and corresponding cells in the cell pool are stored.

The reason for requiring a large amount of memory in the above architecture is that the FIFOS' capacity is not shared among all priorities. One way to allow them to share the memory is to store all cells in a single physical memory, i.e. a cell pool 30, and then retrieve them in sequence according to their priority levels. The corresponding addresses are stored in P FIFOs 32 based on their priority levels, as shown in FIG. 8. In addition to the P FIFOs 32 used to store cell's addresses, there is an idle-address FIFO 34 to store the address of all empty entries in the cell pool 30. When a cell arrives, its priority field accompanied with an idle address will be sent to an address distributor 36. It then stores the address in the proper FIFO 32 based on its priority level. In the meantime, the cell is written to the pool 30 with the idle address. At the output, it is similar to the first architecture in the previous section, where an arbiter 38 will send the address of the highest priority cell to the pool 30 and the cell will be read out and transmitted.

If we use the parameters assumed above, the cell pool capacity is 256 cells, or 13,568 bytes. Each FIFO's capacity is 256×(log$_2$256) bits, or 256 bytes. Thus, the (P+1) FIFO's capacity will be (16,384+1) ×256 bytes and the total amount of required memory will be about 4.2M bytes, much less than the above case (222M bytes). However, the arbiter's speed for scanning all 16,384 FIFO's status is still a bottleneck.

Store Cells In Logical Queues (Third Architecture)

Figure 9:
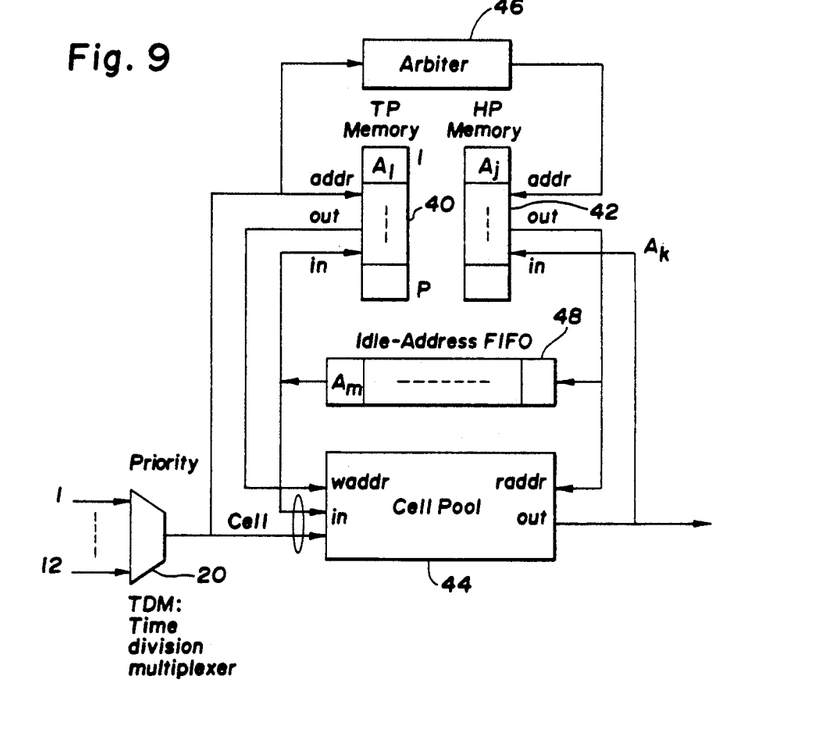
FIG. 9 is a schematic view of a third possible architecture wherein each logically linked queue associated with each priority is represented by two pointers—head and tail pointers.
Figure 10A:
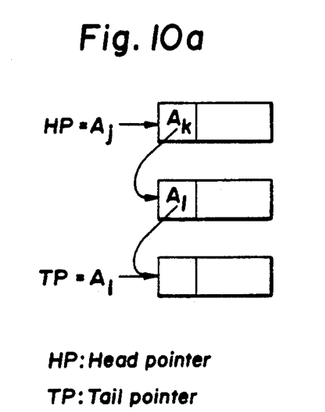
FIGS. 10a through 10c are schematic views which illustrate adding a cell to a logical queue or deleting a cell from it.

In the above architecture (i.e. the second architecture) the memory used to store the addresses for the cells in the pool 30 is much more than that actually used to store cells. In order to reduce the FIFO's capacity as shown in FIG. 9 the P FIFOs 32 of FIG. 8 are replaced by two small memories 40 and 42 with P entries for each. Each entry has both head and tail pointers (HP or TP), indicating the starting and ending address of a logical queue, associated with its priority level and stored in a cell pool 44. Instead of storing each cell's address in FIFOS, only two addresses for every logical queue need be stored, which results in a big memory savings. Every cell in the pool 44 will attach a pointer to point to the next cell that is linked in the same queue as shown in FIG. 10. A similar approach for implementing a priority queue that is able to handle only a small number of priority levels was presented in the paper entitled "Switched Prioritized Packets", IEEE GLOBECOM '89, Dallas, Texas, Nov. 1989, pp. 1181-1186, by A. Lyengar and M.E. Zarki.

Figure 10B:
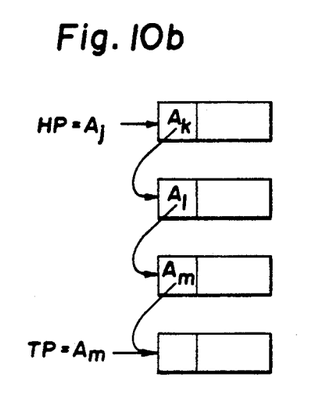

When a cell arrives, it is added to a logical queue properly based on its priority level, as shown in FIG. 10(b). The cell's priority field is extracted first and used as an address to read out the tail pointer from the TP memory 40, e.g. A$_1$. The tail pointer is then used as a writing address for the cell to be written into the pool 44. In the mean time, an idle address (e.g. A$_m$) attached to the cell is written into the cell pool 44 from an idle-address FIFO 48, which will also point to the queue's tail. The TP is then updated with the value of A$_m$. An arbiter 46 records the length of each logical queue in the cell pool 44 and selects one cell to send out in every cell time slot.

Figure 10C:
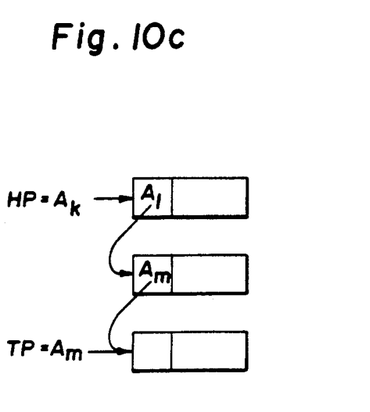

The operation of deleting a cell from a logical queue is shown in FIG. 10(c). The arbiter 46 reads out the head pointer (e.g. A$_j$) from the HP memory 42 that corresponds to the highest priority. This head pointer is used as a reading address to read out the corresponding cell from the pool 44. Once the cell is read out, its pointer (e.g. A$_k$) is written into the HP memory 42 to update the old head pointer.

This architecture saves considerable memory. But it also adds complexity to the arbiter 46 because it has to record the occupancy status of all logical queues with counters and in the worst case, it has to examine all counters (up to 16,384 in this case) to chose a single cell in the cell pool 44. This is very difficult to achieve with state-of-art hardware. Since all of these functions are performed centrally by the arbiter 46, its processing speed limits the number of priority levels. Furthermore, if somehow any pointer in the TP/HP memory 40 or 42, respectively, or in the cell pool 44 becomes corrupted, the linkage between cells in the logical queues will be wrong and cells will be accessed mistakenly. Although this can be checked by adding an extra parity bit to the pointers, it is still not easy to recover from faults once errors occur in the pointer except by resetting the entire cell pool memory.

Sort Priorities Using a Sequencer (Fourth Architecture)

Figure 11:
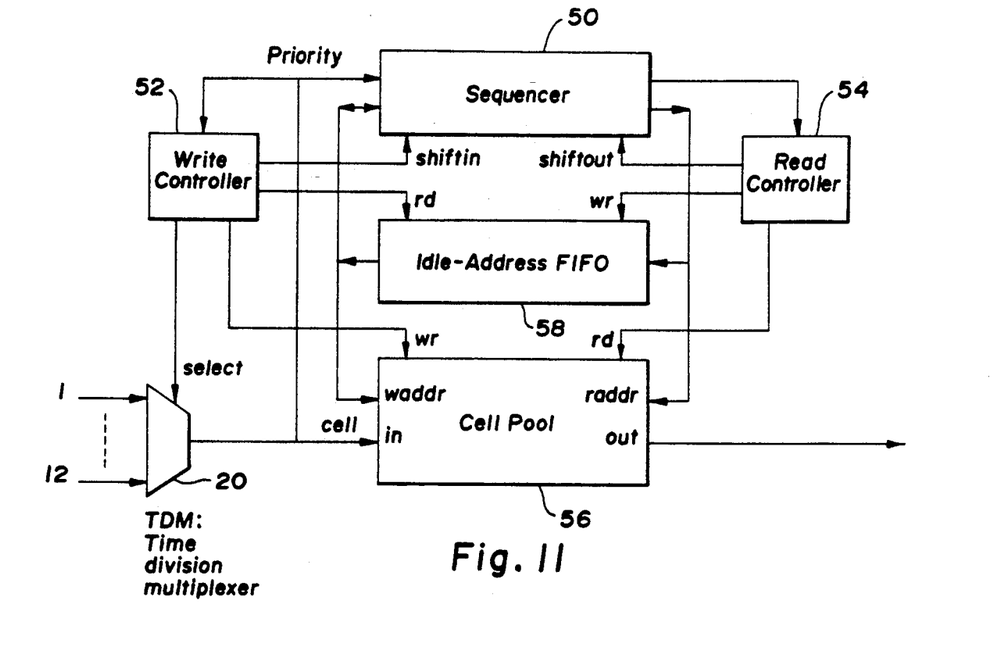
FIG. 11 is a schematic view of an illustrative embodiment of my invention wherein a sequencer determines the transmission sequence of the cells that are stored in the cell pool.

The three architectures described above all limit the number of priorities because of their centralized processing characteristics. In addition, the ones described in the first two sections a large amount of memory. An improved, novel architecture in accordance with my invention is shown in FIG. 11. It requires not only a relatively small amount of memory, but also does not limit the number of priority levels due to the fact that it employs the concepts of fully distributed and highly parallel processing to manage sending and dropping cells in a correct sequence.

Comparing FIG. 8 and FIG. 11, the P FIFOs 32 in FIG. 8 are replaced with a sequencer. Write/read controllers 52 and 54, respectively, generate proper control signals for all other functional blocks. Data and address buses are also indicated. As with the previous architectures, the cells are time-division multiplexed first by the multiplexor 20 and then written into a cell pool 56 with idle addresses stored in a FIFO 58. The pairs (PA) of a cell's priority field and its corresponding address within the pool 56 are stored in the sequencer 50 in such a way that higher priority pairs are always to the right of lower priority ones so that they will be accessed sooner by the read controller 54. Once the pair has been accessed, the address will be sent to the cell pool 56 and the corresponding cell will be read out.

Figure 12A:
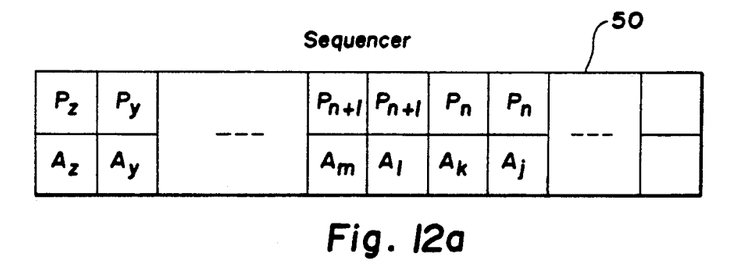
FIGS. 12a and 12b are schematic views of the sequencer of FIG. 11 illustrating the operation of the sequencer wherein as a new pair of priority and address is inserted, all pairs with lower priorities are pushed to the left.
Figure 12B:
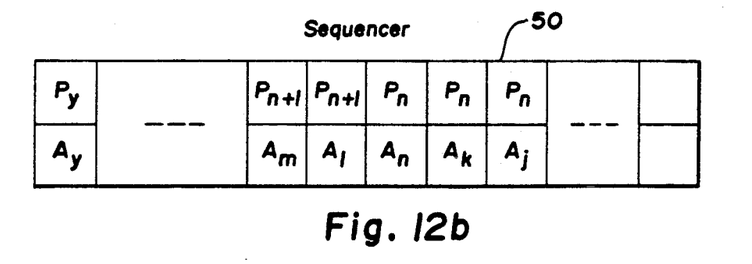

The concept of implementing the sequencer is relatively simple and is illustrated in FIG. 12, in which every priority-address pair is stored. It is assumed that the value of P$_n$ is less than that of P$_{n+1}$ and has the higher priority. When a new cell with a priority P$_n$ arrive pairs on the right of A$_k$, including the A$_k$ itself, FIG. 16 remain at their positions while others are shifted to the left and the vacant position is inserted with the pair of the new cell's priority (P$_n$) and address (A$_n$).

When the cell pool 56 is full (in other words, the idle-address FIFO 58 is empty), the priority field at the left-most position of the sequencer 50 (e.g. P$_z$) is compared with that of the newly arrived cell (P$_n$). If P$_n$ is smaller than P$_z$, the address A$_z$ is taken away and its cell in the pool 56 is overwritten with the new cell. The pair of P$_z$ and A$_z$ will be pushed away from the sequencer 50 as soon as the pair PA$_n$ is inserted in the sequencer 50. However, if P$_n \geq$ P$_z$, the new cell is discarded instead.

Conclusions

This specification presents four architecture designs for queue management and compares their implementation feasibility and hardware complexity the fourth being my inventive architecture and the first three being described to show, by comparison, the advantages and merits of my invention. The described queue management algorithm manages the queued cells in such a way that higher priority cells are always sent to the links before the lower priority ones. The low priority cells are dropped when the queue is full, and within the same priority any interference is prevented. The concept of assigning a departure sequence to every cell in the queue is introduced so that the effects of the long burst traffic on other regular arrival cells is avoided. The architectures discussed herein can be generally applied to any queue management method for ATM switches or statistical multiplexers with either input or output queues.

To support my inventive the architecture, a VLSI chip (called the sequencer 50), containing about 150K CMOS transistors, is designed in a regular structure such that the queue size and the number of priority levels can grow flexibly and without limit. This chip is more fully described in the above-noted application entitled "Sequencer Chip Device." Besides its application in queue management, the chip can also be used to sort out-of-sequence cells efficiently and economically at the receive end when the cells are transmitted through different physical channels in the networks.

While the best mode for carrying out the invention has been described in detail, those familiar with the art to which this invention relates will recognize various alternative embodiments for practicing the invention as disclosed by the following claims.

What is claimed is:

1. A system for managing cells appearing on a plurality of channel inputs, each of said cells having a virtual channel identifier indicating a priority level of the cell, the system comprising means for multiplexing said inputs into a common channel, cell pool memory means connected to said multiplexing means for storing the cells appearing on said channel, the locations in said cell pool memory means being addressable, address memory means for storing addresses corresponding to the addressable locations in said cell pool memory means in which a cell is not yet stored, a sequencer circuit comprising registers for storing the priority-address pair corresponding to the addressable locations in said pool memory means in which a cell is stored in an order based on cell priority level, and means for selecting a specific cell having the highest priority level, said selecting means including means for retrieving the address having the highest priority level of all of the addresses stored in said sequencer circuit.

2. The system in accordance with claim 1 further comprising means for controlling the storing and retrieving of cells in said cell pool memory means, said addresses memory means, and said sequencer circuit.

3. The system in accordance with claim 2 wherein the priority level of each of said priority-address pairs includes both the service class and departure sequence of the associated cell.

4. A method of managing cells appearing on a plurality of channel inputs, each of the cells having a virtual channel identifier indicating a priority level of the cell, the method comprising the steps of multiplexing the inputs into a common high-speed channel;

storing the cells on the channel in a cell pool memory means, the locations in said cell pool memory means being addressable;

storing in an address memory means addresses corresponding to the addressable locations in said cell pool memory means in which a cell is not yet stored, the addressed stored in the address memory means being utilized in the step of storing the cells appearing on the high speed channel, storing in a sequencer circuit comprising registers the priority-address pairs corresponding to the addressable locations in said cell pool memory means in which a cell is stored in an order based on cell priority level, and selecting a stored cell having the highest priority level to obtain a validated cell.

5. The method of claim 4 wherein said step of storing the priority-address pairs in the sequencer circuit includes storing in the priority level both the service class and the departure sequence of the associated cell.

* * * * *